United States Patent [19]

Bjorkholm et al.

[11] 4,303,860

[45] Dec. 1, 1981

[54] HIGH RESOLUTION RADIATION DETECTOR

[75] Inventors: Paul J. Bjorkholm, Sharon; Victor M. Benveniste, Magnolia, both of Mass.

[73] Assignee: American Science and Engineering, Inc., Cambridge, Mass.

[21] Appl. No.: 61,739

[22] Filed: Jul. 30, 1979

[51] Int. Cl.³ .......................... G01T 1/20; G01T 1/24
[52] U.S. Cl. ............................. 250/363 S; 250/366; 250/368; 250/370
[58] Field of Search .......... 250/367, 368, 366, 363 R, 250/363 S, 370

[56] References Cited

U.S. PATENT DOCUMENTS

| | | | |
|---|---|---|---|
| 3,048,698 | 8/1962 | Carlson | 250/367 |
| 3,225,193 | 12/1965 | Hilton et al. | 250/367 |
| 3,944,833 | 3/1976 | Hounsfield | 250/367 |
| 4,070,581 | 1/1978 | Gibbons et al. | 250/367 |

FOREIGN PATENT DOCUMENTS

| | | | |
|---|---|---|---|
| 2007457 | 5/1979 | United Kingdom | 250/367 |
| 502349 | 4/1976 | U.S.S.R. | 250/368 |

*Primary Examiner*—Alfred E. Smith
*Assistant Examiner*—Carolyn E. Fields
*Attorney, Agent, or Firm*—Pollock, Vande Sande & Priddy

[57] ABSTRACT

A high resolution detector having a scintillation crystal for receiving incident X-rays at a front face and interacting with the radiation to generate corresponding visible light radiation. Silicon photodiode arrays are positioned on top and bottom lateral faces of the scintillation crystal to receive the visible light that is radiated laterally with respect to the direction of propagation of the incident X-rays. Photodiode elements in each photodiode array extend from the forward face of the scintillation crystal in the direction of propagation of the incident X-rays. The length of the photodiode elements determines the radiation stopping power of the high resolution detector and the height of the front face of the scintillation crystal determines the resolution of the detector. The height of the forward face of the crystal may be made small with respect to the length of the photodiode elements to provide a detector having high resolution and high radiation stopping power.

12 Claims, 6 Drawing Figures

HIGH RESOLUTION RADIATION DETECTOR

DESCRIPTION

TECHNICAL FIELD

The invention relates to a high resolution radiation detection apparatus, and, more particularly, to such an apparatus including means for achieving a high resolution measurement of incident radiation and a high radiation stopping power and detection efficiency.

BACKGROUND ART

Systems utilizing high energy radiation, for example X-radiation and gamma radiation, to examine the internal structure of a solid object are well known to the art. Such systems typically irradiate an object under examination with a high energy beam and utilize detection apparatus to measure the intensity of the radiation that is transmitted through the object.

For example, it is known to the art, especially for medical applications, to use a film to record an image of the X-rays that are passed through a human body. Such a film typically includes a top screen of fluorescent material that fluoresces to produce visible light radiation in response to incident high energy X-rays. The light radiation from the top screen passes to a photosensitive film that reacts to the emitted visible light to physically record an image. Such films are used to provide a radiograph of the irradiated body, the radiograph having a resolution of the order of 5 line pairs per millimeter.

The thickness of the top fluorescent screen determines both the resolution of the radiograph and the X-ray stopping power of the film. The stopping power of the film increases as the thickness of the fluorescent screen is increased, since a thicker screen is better able to interact with incident X-rays and generate corresponding visible light. However, as the thickness of the screen increases, the resolution of the film decreases, since the thicker screen tends to increase the scattering of the visible light that is applied to the photosensitive film.

Although X-ray film produces a radiograph having a relatively high resolution, the film necessarily requires a substantial amount of time to develop and, in addition, the film requires a relatively high level of exposure of X-rays to produce a satisfactory radiograph. Also, the film image is not in a form that readily lends itself to computer storage or analysis.

Accordingly, systems have been developed for more rapidly recording the intensity of X-rays or other high energy rays that are transmitted through a target object. Such systems typically employ a scintillation crystal to convert incident X-rays to corresponding visible light radiation. A photodetector is then used to generate an electrical signal corresponding to the intensity of the visible light. The electrical signal from the photodetector may be readily converted to a digital representation and stored in a memory device or electronically displayed, for example, on a cathode ray tube. Of course, the digital data that is derived from the detector signals is suitable for use with a computer.

Prior art radiant energy imaging systems have employed a scintillation crystal and associated solid state optical detectors, for example silicon photodiode arrays, to generate electrical signals corresponding to the intensity of incident X-rays. Such electronic detection apparatus has been used in conjunction with scanning pencil beams or fan beams of radiant energy to quickly provide a radiograph of a scanned target object at relatively low radiation levels. For example, the MICRODOSE ® system, as disclosed in U.S. Pat. No. 3,780,291, employs a scanning pencil beam of radiation and an associated scintillation crystal and photodetector to provide both digital radiation intensity data and a corresponding image of an irradiated target object.

It has been proposed for Computerized Axial Tomography scanning systems to use a fan beam of radiation to irradiate a transverse line on a target body and to illuminate corresponding radiation detectors with the fan beam radiation that emerges from the body. The fan beam in such a system is rotated around the body to scan a particular cross-sectional slice of the body and the radiation detectors are electronically scanned to generate an image of the irradiated slice.

Prior art electronic radiation detection devices have been used to produce electronic radiographic images much more quickly than can be done with film and at lower radiation doses than are required to produce images on an X-ray film. However, the radiographic images produced with such prior art electronic radiation detectors have not had the high resolution that is characteristic of radiographic images produced on film. Therefore, electronic imaging systems have not heretofore been suitable for producing high resolution radiographic images.

More particularly, the thickness of the scintillation crystal in prior art electronic radiation detectors has caused a significant loss of resolution due to the normal spread and scattering of the visible light that is generated within the crystal. In such prior art devices, the photodetector is placed behind an associated scintillation crystal and the penetrating X-radiation is applied to illuminate the forward face of the crystal. Thus, the thickness of the scintillation crystal determines the radiation stopping power of the crystal and also affects the resolution of the visible light that is measured by the photodetector. Therefore, in prior art radiation detection devices, the thickness of the scintillation crystal, while providing adequate radiation stopping power, significantly reduces the resolution of the detector.

Accordingly, it is an object of the invention to provide an effective means to both increase the radiation stopping power of an electronic radiation detector and to increase the associated resolution of the detector.

A further object of the invention is to provide such a high resolution detector that will operate at lower levels of radiation than are required to expose an X-ray film.

Another object of the invention is to provide an improved radiant energy imaging apparatus utilizing the high resolution detector of the invention to produce radiographic images having a resolution of at least 5 line pairs per millimeter.

These and other objects of this invention will become apparent from a review of the detailed specification which follows and a consideration of the accompanying drawings.

DISCLOSURE OF INVENTION

In order to achieve the objects of the invention and to overcome the problems of the prior art, the high resolution detector, according to the invention, includes a scintillation crystal extending in the direction of propagation of incident X-rays for interacting with the X-rays to generate corresponding visible light radiation. The visible light is passed through a lateral portion of the crystal and emerges from a top and a bottom lateral emission face of the crystal.

Solid state detector arrays having a plurality of detector elements are positioned along the lateral emission faces of the crystal to receive the visible light that is emitted and to generate corresponding electrical signals. An optical coupling grease is disposed between the solid state detectors and the lateral emission faces of the crystal. Successive solid state detector arrays alternate in position between the lateral emission faces and overlap one another to provide a continuous radiation receiving area along the crystal. The detector elements of the detector arrays extend from the front of the scintillation crystal in the direction of propagation of the incident X-rays.

The length of the detector elements determines the X-ray stopping power of the high resolution detector. The height of the forward face of the crystal and the critical angle defined by the ratio of the refractive indexes of the crystal and coupling grease determine the maximum length of the lateral emission path of the visible light and thereby determine the resolution of the detector.

An alternative embodiment of the invention includes fluorescent optical fibers that are used to generate visible light in response to applied X-rays. A further embodiment of the invention includes optical fibers for optically connecting the lateral emission faces of the crystal with corresponding detector arrays.

The high resolution detector, in accordance with the invention, may be used in pencil beam and fan beam radiant energy imaging systems to produce electronic radiographic images of high resolution.

BEST MODE FOR CARRYING OUT THE INVENTION

Figure 1:
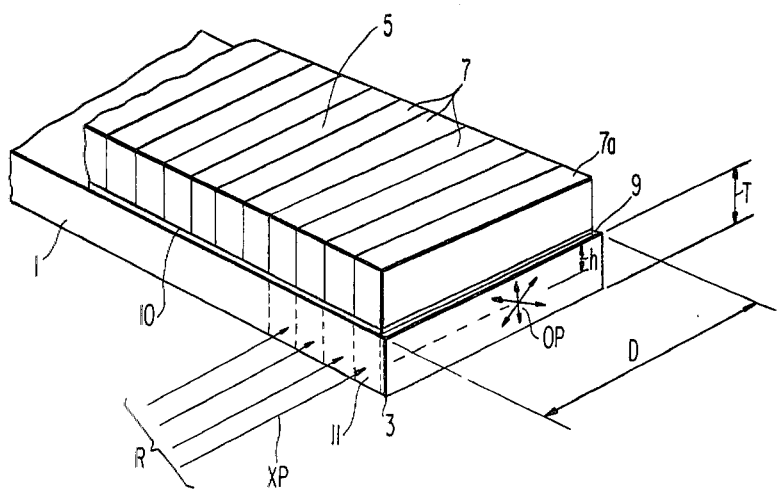
FIG. 1 shows a perspective view of a scintillation crystal and associated photodiode array in accordance with the invention.

The remaining portion of the specification will describe preferred embodiments of the invention when read in conjunction with the attached drawings, in which like reference characters identify identical apparatus.

FIG. 1 illustrates a perspective view of a portion of a high resolution radiation detector in accordance with the invention. In operation, incident radiation R, for example X-rays, are applied to the front face 1 of a scintillation crystal 3. It will be appreciated by those skilled in the art that as the X-rays pass through the scintillation crystal, the material of the crystal will interact with X-ray photons to generate corresponding optical or visible light photons. Such a scintillation crystal may be made for example of cesium-iodide.

The visible light that is given off by the scintillation crystal 3 is then detected by a photodetector that generates an electrical signal corresponding to the intensity of the visible light. The detector shown in FIG. 1 comprises a photodiode array 5 having many solid state light sensing diodes 7 arranged on a chip. Such a photodiode array may be obtained commercially, for example as produced by Reticon.

Referring now to FIG. 1 it can be seen that the photodiode array 5 includes many small photodiode elements 7, each of which is adapted in a manner known to the art to generate an electrical signal corresponding to the intensity of light seen along the surface of the photodiode element that abuts the top lateral surface 9 of the scintillation crystal 3.

Thus, when an X-ray photon XP passes through a slice 11 of the scintillation crystal 3 and interacts with the material of the scintillation crystal to generate corresponding optical photons OP, at least a portion of the optical photons will pass through the material of the scintillation crystal 3 to the top lateral surface 9 and will be detected by a corresponding photodiode element 7a. Of course, the photodiode element 7a will generate an electrical signal corresponding to the optical photons OP that are received.

The other photodiode elements 7 in the photodiode array 5 will react in the same manner to optical photons that are emitted by X-ray photons travelling through associated slices of the scintillation crystal 3.

It should be understood that the radiation detector of FIG. 1 has both a high resolution and a high X-ray stopping power. The high X-ray stopping power is due to the relatively long X-ray penetration depth D, corresponding to the length of the photodiode elements 7. The photodiode elements 7 are aligned in the direction of propagation of the incident X-rays R and each photodiode element is sensitive along its length D to light photons produced by a passing X-ray photon. Thus, the length of the photodiode elements 7 determines the range of X-ray penetration depths that will result in a measurable optical signal. Of course, it is important to have a sufficient X-ray penetration depth in order to ensure that a substantial number of incident X-ray photons produce measurable interactions with the scintillation crystal 3.

The X-ray detector has a high resolution since the distance h that the generated optical photons OP must pass is relatively small. It should be understood that, in general, the thickness T of the scintillation crystal 3 determines the distance that any light photon must travel to reach an associated photodiode element 7. Therefore, if the thickness of the scintillation crystal is made small, for example on the order of 0.3 millimeter, there is a corresponding reduction in the scattering or attenuation of the optical photons OP that are generated by the interaction of X-ray photons and the material of the scintillation crystal 3.

It will be understood by those skilled in the art that the radiation from an emitting point of light within the scintillation crystal may be emitted from a lateral emission face of the crystal within an area defined by the distance of the point from the emission face times the tangent of the critical angle at the interface between the crystal and the photodiode arrays. Of course, as the size of the area of emission of a point source of radiation is increased, the resolution of the detector of the invention is correspondingly reduced. Accordingly, the resolution of the detector may be increased if the index of refraction at the interface between the crystal and the photodetectors is reduced.

A coupling grease 10, for example a Dow Corning coupling grease, having an index of refraction that is less than that of the crystal, may be placed at the interface between the crystal and the photodiode arrays to reduce the index of refraction at the interface. In operation, the grease 10 may be applied to the lateral emission faces of the crystal and the photodiode arrays may then be pressed into contact with the greased surface of the crystal. Capillary action and the high viscosity of the grease prevent creeping or flowing of the grease over time.

Thus, light that is incident to the lateral emission surface of the crystal at an angle that is greater than the critical angle defined by the ratio of the refractive indexes of the crystal and coupling grease, will be totally reflected at the interface. The reflected radiation will propagate within the crystal by further reflections until it is eventually absorbed.

It should be appreciated that the arrangement of the photodiode array 5 and the scintillation crystal 3 in accordance with the invention allows the X-ray penetration depth to be increased so that the stopping power of the detector is increased without affecting the resolution of the detector. It will be appreciated by those skilled in the art that prior art radiation detectors have photodetectors that are positioned behind an associated scintillation crystal. In such prior art detectors, increasing the thickness of the scintillation crystal to achieve a greater stopping power necessarily results in a decreased resolution, since the light photons, generally, have a greater distance to travel to reach an associated photodetector. Thus, the stopping power and resolution of prior art detectors is determined by a single dimension of the associated scintillation crystal.

However, in accordance with the invention, the scintillation crystal and the associated photodetector are positioned so that one dimension of the crystal determines the resolution of the detector and another dimension of the crystal determines the stopping power of the detector.

Figure 2:
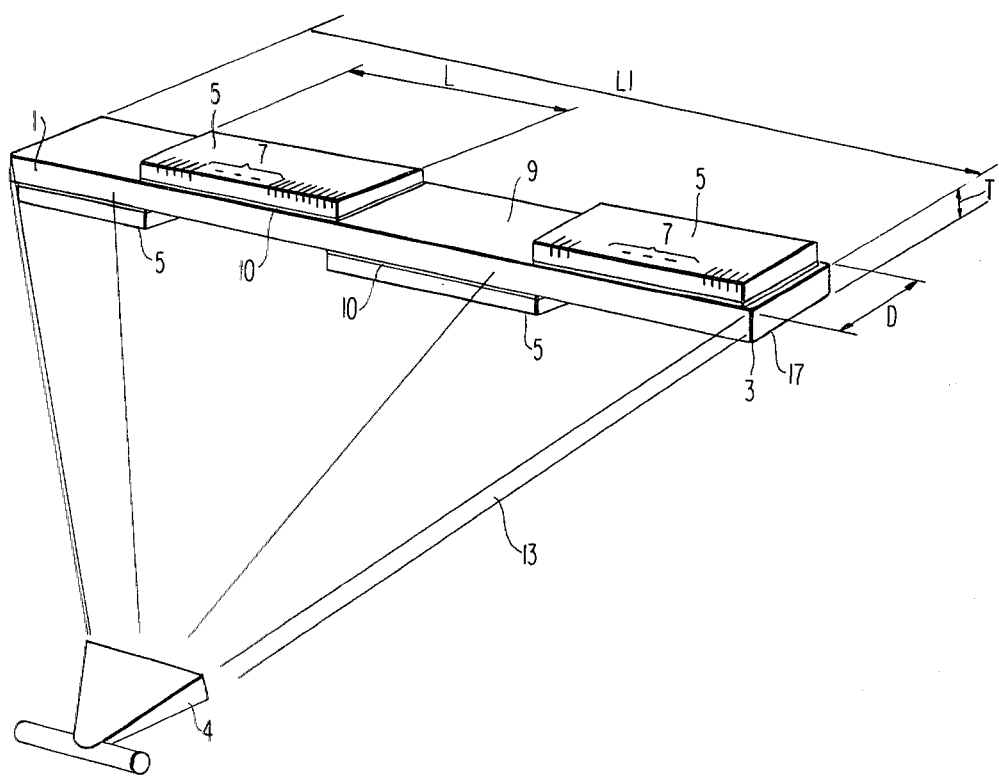
FIG. 2 shows a perspective view of a scintillation crystal and a plurality of photodiode arrays in accordance with the invention.

FIG. 2 illustrates a perspective view of a preferred embodiment of the invention for measuring the intensity of X-rays or other high energy radiation that is applied over an area substantially greater than the length L of a photodiode array 5. In accordance with the invention, photodiode arrays 5 are placed on the top lateral surface 9 and a bottom lateral surface 17 of a scintillation crystal 3. It is necessary to utilize a plurality of photodiode arrays in this manner since photodiode arrays having larger dimensions are not readily available. However, it should be appreciated that a single photodiode array may be used if the length L of the photodiode array 5 corresponds to the length L1 of the scintillation crystal 3.

The commercially available photodiode arrays 5 of the preferred embodiment of FIG. 2 have a length L of approximately 1 inch and include 1024 photodiode elements that are each light-sensitive along a length D of approximately 2 millimeters. The scintillation crystal 3 has a thickness T of approximately 0.3 millimeter. As explained previously, the thickness T and critical angle at the interface between the crystal and photodiodes are determinative of the resolution of the radiation detector. The length D of the photodiode elements 7 of the photodiode arrays 5 is determinative of the stopping power or maximum X-ray penetration depth of the X-ray measuring apparatus of the invention.

The photodiode elements within each array do not extend to the edge of the associated monolithic chip due to practical limitations in the manufacturing process. Therefore, it is not practicable to place all of the photodiode arrays 5 in abutting relation in a line on one lateral face of the scintillation crystal 3, since the end portions of the arrays would then form unacceptable gaps in the line of light sensitive elements of the arrays.

Thus, in order to provide a uniform line of radiation detecting elements, successive photodiode arrays may be placed at positions that alternate between the top lateral surface 9 and the bottom lateral surface 17 of the scintillation crystal 3. It should be understood that each photodiode array 5 is placed to slightly overlap the associated edge area of the preceding photodiode array so that the photodiode elements on the adjacent edges of the arrays may be properly aligned. The photodiode arrays 5 may be positioned in this alternating, overlapping relation along the length of the scintillation crystal 3 to provide a radiation measuring area of any particular length.

It should be understood that it is not necessary to closely align the photodiode elements from side to side since the maximum center to center displacement of approximately 0.012 mm, or one half of a pixel, will have little effect on the quality of a radiograph that is generated from the electrical signals of the photodiode arrays. Also, it will be appreciated by those skilled in the art that a computer correction may be applied to smooth the data that is received from the areas of overlap of the arrays.

In operation, a high energy source 4 of radiation, for example a collimated fan beam of radiation 13, is directed at the front edge 1 of the crystal 3. The X-ray photons pass through the distance D of the scintillation crystal 3 and interact with the crystal to produce associated optical photons that are detected by the elements 7 of the photodiode arrays 5. The electrical signals of the photodiode elements are scanned and then stored or displayed on a display device, for example, a CRT. It should be understood that a scanning pencil beam of X-rays or any collimated or uncollimated source of X-rays may be used to irradiate the front face 1 of the crystal 3. In general, the dimension D of the photodetector elements 7 is sufficiently small to ensure that the loss of resolution is small if X-rays incident at the front face 1 are divergent, as when a fan beam source is used.

Figure 3:
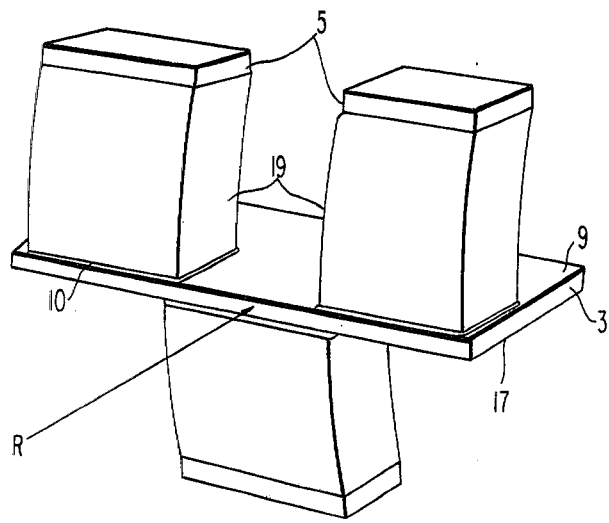
FIG. 3 shows a perspective view of an alternative embodiment of the invention utilizing optical fibers to connect emission faces of the scintillation crystal and related photodiode arrays.

FIG. 3 illustrates a perspective view of an apparatus according to the invention wherein light pipes or bundles of optical fibers 19 are used to transmit optical photons from the lateral emission surfaces 9 and 17 of the scintillation crystal 3 to the associated photodiode arrays 5. Of course, the use of such fiber optic elements does not materially change the operation of the apparatus of the invention.

As explained previously, for the embodiment of FIGS. 1 and 2, incident high energy primary radiation, for example, X-radiation, is converted to secondary light radiation by a scintillation crystal and the light radiation is received by a photodiode array that emits a corresponding quantity of electrons to produce an electrical signal. However, it will be appreciated by those skilled in the art that the photodiode arrays of FIG. 1 may be employed to directly receive the primary X-radiation and to emit as "secondary radiation" the corresponding electrons that define proportional electrical signals.

Thus, in accordance with the invention, the photodiode arrays may be used by themselves to generate signals that are proportional to the intensity of incident X-radiation, although such use may result in a decreased operational life for the arrays. Of course, for such an embodiment, the arrays are positioned to receive radiation at a front face and are dimensioned to extend a sufficient distance D in the direction of propagation of the radiation to stop a measurable portion of the X-rays.

Figure 4:
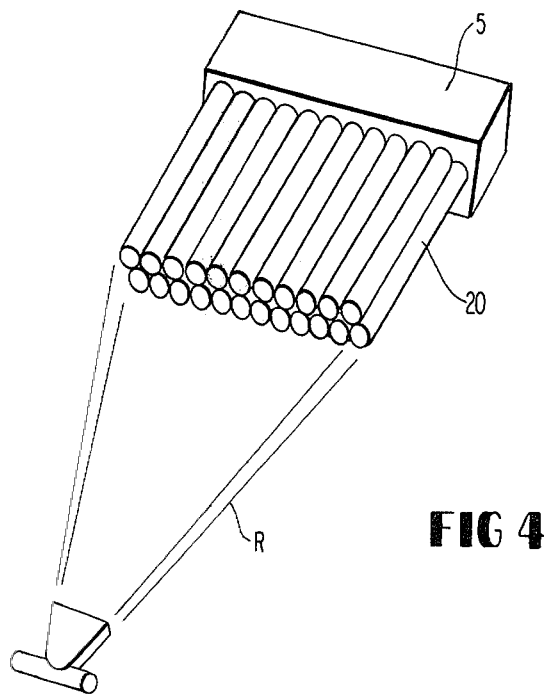
FIG. 4 illustrates a perspective view of an alternative embodiment of the invention utilizing fluorescent optical fibers.

FIG. 4 illustrates an embodiment of the invention wherein fluorescent optical fibers 20 may be used instead of a scintillation crystal to generate optical photons in response to high energy radiation R. Such fluorescent optical fibers are known to the art and include means for internally fluorescing in response to applied X-radiation.

In operation, a high energy source of radiation, for example, a collimated fan beam of radiation R, is directed to irradiate the front ends of the optical fibers 20. As the X-ray photons pass along the axis of the fibers 20, the photons interact with the fluorescent material of the fibers to generate corresponding photons of visible light. The photons of visible light are carried by the optical fibers to photodiode arrays 5 that are optically connected to the emitting ends of the optical fibers. The photons of visible light are sensed by the photodiode elements of the photodiode arrays in the same fashion as was described for the scintillation crystal of FIG. 2. The detector of FIG. 4 has a high resolution since the internally generated light is contained by the fibers as it is passed to the photodiode arrays.

Figure 5:
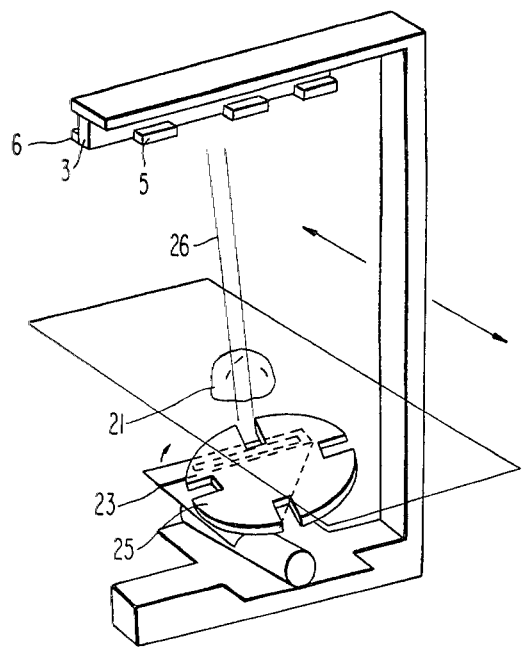
FIG. 5 illustrates a perspective view of a pencil beam imaging system in accordance with the invention.

FIG. 5 illustrates a scanning pencil beam, radiant energy imaging apparatus that may employ the high resolution detector of the invention. Such an imaging apparatus is commercially available in the MICRO-DOSE ® X-ray system that is disclosed in U.S. Pat. No. 3,780,291.

Referring now to FIG. 5, it should be understood that, in operation, a target 21 is placed between a radiation detector 6 according to the invention and an X-ray source 23 and associated chopper 25. The X-ray source 23 generates a fan beam of radiation and the chopper 25 is rotated to interrupt the fan beam and to thereby generate a pencil beam 26 of X-rays. The pencil beam 26 moves in a transverse direction with respect to the target 21 to scan a cross-section of the target 21. As the beam moves in a transverse direction, the radiation that is transmitted through the target is passed to the front edge of the scintillation crystal 3 and the intensity of the transmitted radiation is measured by the photodiode elements of the associated photodiode arrays 5 in the manner described for the detector of FIG. 2. The electrical signal of the photodiode arrays are scanned and representations of the electrical signals are stored and displayed in a manner known to the art.

It should be understood that the scintillation crystal 3 and associated photodiode arrays 5 of the radiation detector 6 of FIG. 5 are stationary while the beam is transversely scanning, so that successive areas along the length of the detector 6 receive the radiation that is transmitted through the target 21. After each transverse line scan of the beam 26 across the target 21, the detector 6 and the beam are moved forward an incremental distance in a direction at right angles to the transverse scanning direction, and the beam executes a new line scan of the target. Thus, successive lines or cross-sections of the target are scanned and the successive line scans are combined in a manner known to the art to produce a radiographic image of the scanned portion of the target.

Figure 6:
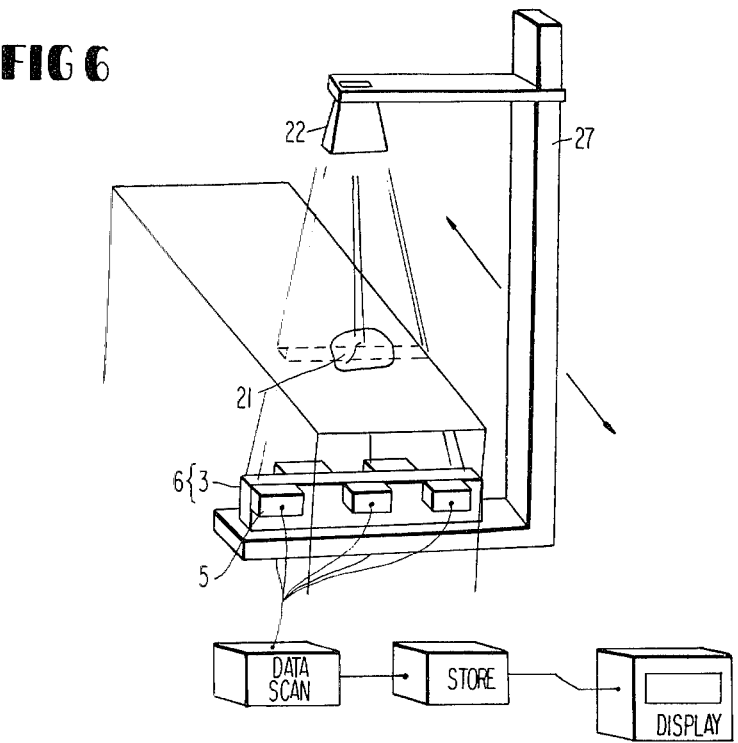
FIG. 6 illustrates a perspective view of a fan beam imaging system in accordance with the invention.

FIG. 6 illustrates a radiant energy imaging apparatus that employs a fan beam source 22 of radiation to scan across the target 21. In operation, a fan beam of high energy radiation is generated in a manner known to the art and is directed to pass through a cross-sectional slice of the target 21 and irradiate the front edge of the scintillation crystal 3 of the high resolution detector 6. It should be understood that for the apparatus of FIG. 6, an entire line or cross-section of the target 21 is irradiated at one time and the corresponding transmitted radiation irradiates the entire length of the scintillation crystal 3 of the high resolution detector 6. The corresponding electrical signals generated by the photodiode arrays 5 positioned along the length of the crystal 3 are scanned, stored and displayed if desired.

The fan beam may be rapidly moved to scan the entire length of the target 21 by moving the support 27 that rigidly holds the radiation detector 20 and the fan beam radiation source 6. Of course, as the fan beam scans along the length of the target 21, the photodiode arrays of the radiation detector 6 are continuously scanned to provide radiation absorption data for successive lines or cross-sections of the target 21. As indicated previously, a radiographic image produced in such a fashion should provide at the very least the same resolution as a radiograph produced with screen film. However, since the scintillation crystal 3 is more efficient in detecting X-rays than the screen film, the electronically produced radiograph may be provided at lower X-ray exposure levels.

Although silicon photodiode arrays are used as photodetectors in the preferred embodiment of the invention, it should be understood that other photo detection means may be used without departing from the spirit of the invention, provided that such other detection means have a sufficiently small radiation-measuring area. In addition, it should be appreciated that although measurements of the dimensions of the scintillation crystal and the photodiode arrays are provided for the preferred embodiment of the invention, other dimensions may be used without departing from the spirit of the invention. Also, it should be understood that, in accordance with the invention, a plurality of scintillation crystals and associated photodiode arrays may be stacked to provide an array of high resolution detectors for simultaneously measuring the radiation over an irradiated area of increased width.

If such an imaging apparatus is used in combination with the detector of the invention, a very high resolution radiographic image of a target 21 may be obtained. More particularly, such an imaging apparatus will produce a radiographic image having a resolution of at least 5 line pairs per millimeter. Such a resolution is equivalent to the resolution now available for screen film, although an imaging system in accordance with the invention will provide a high resolution electronic image at a much lower exposure level than is required for producing a comparable image with a screen film system. In addition, such a high resolution electronic imaging system has the added advantage of providing digital data that may be efficiently stored, analyzed or displayed by electronic means.

Thus, the invention may be embodied in other specific forms without departing from its spirit or essential characteristics. Therefore, the present embodiments are to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A high resolution radiation detecting apparatus for generating electrical signals representative of the intensity of incident primary radiation, the apparatus comprising:
    at least one scintillation crystal for receiving primary radiation and generating corresponding secondary radiation, said at least one scintillation crystal including a front face for receiving incident primary radiation, a back face opposite said front face and top and bottom emission faces for emitting at least a portion of said secondary radiation, the distance between said front and back faces being sufficiently great to allow a desired portion of said primary radiation to be stopped by said at least one scintillation crystal, and the distance between said top and bottom emission faces being sufficiently small to minimize the scattering of said secondary radiation within said scintillation crystal before the secondary radiation is emitted from the crystal;
    detector means including a plurality of radiation detecting elements, each element having means for generating an electrical signal representative of the intensity of incident secondary radiation; and
    coupling means for passing the secondary radiation emitted from areas of at least one of said emission faces to associated detecting elements.

2. The apparatus of claim 1 wherein said detector means includes at least one solid state detector and said radiation detecting elements are photodiodes of the solid state detector.

3. The apparatus of claim 1 wherein said detector means includes:
    a first plurality of solid state detector devices, each device having a plurality of said radiation detecting elements, the devices arranged in a spaced relation with respect to one another along said top emission face of the scintillation crystal, and
    a second plurality of solid state detector devices, each device having a plurality of said radiation detecting elements, the devices arranged in a spaced relation with respect to one another along said bottom emission face at positions opposite the spaces defined for the devices of the top emission face and overlapping on either side of the spaces.

4. The apparatus of claim 1 wherein said coupling means includes a coupling grease disposed between said detector means and the surface of said at least one emission face for reducing the lateral spreading of the secondary radiation that passes from the emission face to the detector means.

5. The apparatus of claim 1 wherein said coupling means includes optical fibers for optically connecting said detector means and the surface of said at least one emission face.

6. The apparatus of claim 1 wherein the dimension of said at least one scintillation crystal between said front face and said back face is greater than the dimension of said crystal between said top and bottom emission faces.

7. An improved radiant energy imaging apparatus of a type wherein a source of high energy radiation generates an associated beam of radiation and the beam is moved to irradiate successive cross-sections of a target body and the radiation that is transmitted through the body is converted to video signals for display, the improvement comprising:
    a scintillation crystal positioned adjacent said body and having a front face for receiving the transmitted radiation, the crystal extending a particular distance in the direction of propagation of said transmitted radiation for interacting with a desired portion of the transmitted radiation and generating corresponding light radiation that is emitted from a top and a bottom lateral emission face of the crystal, the distance between said top and bottom lateral emission faces being sufficiently small to minimize the scattering of said light radiation within the scintillation crystal before the light radiation is emitted from the crystal; and
    detector means for receiving the emitted light radiation from at least one of said emission faces and generating electrical signals corresponding to the intensity of the emitted light radiation, the detector means including a plurality of radiation detecting elements, each element for receiving the secondary radiation emitted from an associated area of said at least one emission face.

8. The radiant energy imaging apparatus of claim 7 including means for generating a fan beam of high energy radiation to pass through a cross-sectional portion of said body and irradiate the length of said scintillation crystal.

9. The radiant energy imaging apparatus of claim 7 including means for generating a pencil beam of high energy radiation and transversely scanning said pencil beam across said body and along the length of said scintillation crystal to produce a cross-sectional scan of the body.

10. The radiant energy imaging apparatus of claim 7 wherein said detector means includes, a first plurality of solid state detectors positioned in a spaced relation along the length of the top lateral emission face of the scintillation crystal, and a second plurality of solid state detectors arranged along the length of the bottom lateral emission face of the scintillation crystal in a spaced relation at positions opposite the spaces defined for the detectors of the top emission face and overlapping on either side of the spaces.

11. The radiant energy imaging apparatus of claim 10 wherein each of said solid state detectors includes a plurality of said detecting elements for detecting emitted light radiation and generating corresponding electrical signals, each detecting element extending from the front of its associated lateral emission face in the direction of propagation of said transmitted radiation.

12. The radiant energy imaging apparatus of claim 10 including optical coupling means disposed between said solid state detectors and said scintillation crystal for reducing the lateral spreading of the light radiation that passes from the scintillation crystal to the solid state detectors.

* * * * *